Jan. 20, 1959 A. J. W. M. VAN OVERBEEK 2,870,310

INDICATOR CIRCUIT ARRANGEMENT

Filed Dec. 12, 1955

INVENTOR
ADRIANUS JOHANNES WILHELMUS
MARIE VAN OVERBEEK
BY
AGENT

United States Patent Office 2,870,310

Patented Jan. 20, 1959

2,870,310

INDICATOR CIRCUIT ARRANGEMENT

Adrianus Johannes Wilhelmus Marie van Overbeek, Eindhoven, Netherlands, assignor, by mesne assignments, to North American Philips Company, Inc., New York, N. Y., a corporation of Delaware Application December 12, 1955, Serial No. 552,595

Claims priority, application Netherlands December 13, 1954

9 Claims. (Cl. 219—10.77)

The invention relates to a circuit arrangement for the indication of temperature and/or radiation. Such arrangements may, for example, be used in fire-alarm systems and other temperature safety systems, in which, when a prescribed temperature and/or intensity of radiation is exceeded, an alarm device and, if necessary, other safety devices are to be made operative. They may furthermore be used for stating the passage of persons and/or vehicles by intercepting a beam of usually invisible light. A third use may be found in a temperature control device, for example to keep the temperature constant in a particular space (thermostat).

The invention has for its object to provide a simple and sensitive arrangement which may be used for these purposes. It is characterized by a transistor exposed to the temperature or to the radiation and connected as an oscillator with collector limitation, the oscillator amplitude of this transistor providing the indication concerned.

The invention will be described with reference to the drawing.

Figure 1:
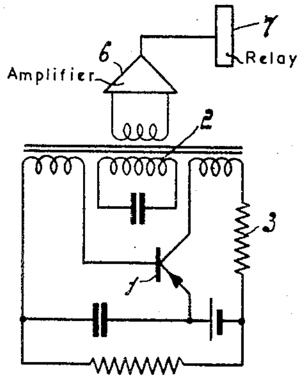
Fig. 1 shows one embodiment of the invention.

The embodiment shown in Fig. 1 comprises a transistor 1, of which the collector electrode is fed back through a selective feed-back circuit 2 to its base electrode. Thus, sinusoidal oscillations are produced, the amplitude of which is limited since the collector circuit includes such a high resistance valued, preferably non-bypassed resistor 3, that collector limitation occurs, i. e. the alternating collector-emitter voltage drops instantaneously to such a low value that the transistor no longer amplifies.

Figure 2:
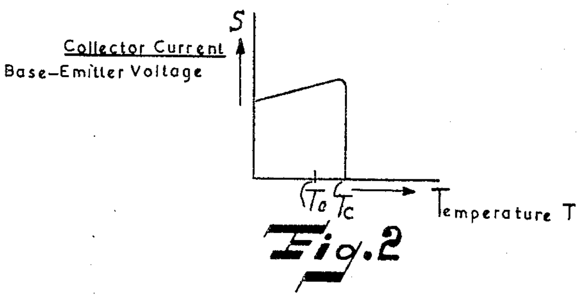
Fig. 2 shows a characteristic curve to explain the embodiment shown in Fig. 1.

It is now found that the amplitude of the oscillation thus produced varies with the ambient temperature and with the intensity of the radiation striking the transistor 1. In Fig. 2 the collector-current steepness $$S=\frac{i_c}{V_{be}}$$

(wherein $i_c$=the collector current and $V_{be}$=the base-emitter voltage) is plotted as a function of the temperature T. This characteristic curve exhibits a slow rise and then an abrupt drop produced by the said collector limitation.

At a temperature $T_0$, below the temperature at which the drop occurs, the steepness S causes the circuit to generate. The collector voltage then fluctuates sinusoidally about a direct-voltage value determined by the temperature $T_0$. However, since this collector voltage cannot instantaneously drop below a minimum value of about 0.1 v., at which the transistor no longer amplifies, the amplitude of the alternating voltage produced is determined by the difference between this direct-voltage value and the minimum value.

At an increase in temperature the direct-voltage value and hence also the amplitude of the alternating voltage produced decreases, which is an indication of the temperature. The alternating voltage produced, which may vary by a few 0.1 v. per degree centigrade, is supplied via an alternating-voltage amplifier 6, to a relay 7. An alarm device can be switched on and/or loads operating at an excessively high temperature can be switched off through the relay 7. This has the advantage that even if the transistor is damaged by excessively high temperatures, so that the oscillation ceases, an alarm is given, since this must respond to a drop of the oscillation amplitude produced below a certain minimum value. A completely analogous conduct is observed if the radiation intensity impinging on the transistor varies instead of the temperature. A source of radiation may be positioned as shown at 12 in Figures 1 and 3.

Figure 3:
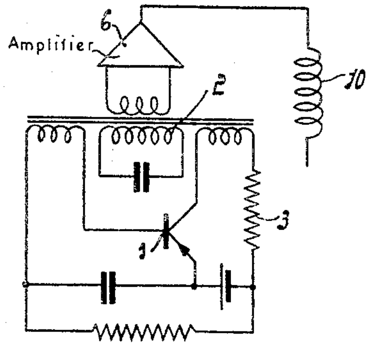
Fig. 3 shows a variant of the embodiment shown in Fig. 1.

Fig. 3 shows a variant of the arrangement shown in Fig. 1 for a thermostat. The oscillation produced by the oscillator 1, 2, 3, and increasing in amplitude at a decrease in temperature is supplied via the amplifier 6 to a heating winding 10. The winding 10 thus supplies at an adequate amplification, the energy required to counteract the decrease in temperature. The winding 10 is shown for the sake of clarity at the side of the arrangement, but in general it will surround the space containing this arrangement and to be kept at a constant temperature.

What is claimed is:

1. A circuit arrangement comprising a transistor having emitter and base electrodes defining an input electrode system and a collector electrode defining with one of said electrodes an output electrode system, means for producing electrical oscillations comprising a feedback circuit intercoupling said output electrode system and said input electrode system in a manner to produce a positive feedback, means for deriving an output signal from said output electrode system, said transistor undergoing variations in collector current in response to radiations impinging thereon, means for impinging radiations on said transistor, means connected between said collector electrode and one of the electrodes of said input electrode system for providing an instantaneous emitter-collector voltage drop approaching zero thereby to limit the amplitude of said oscillations and to produce an output signal having an amplitude which varies substantially solely in accordance with the intensity of said impinging radiations, and utilization means responsive to said output signal amplitude and coupled to said output electrode system.

2. A circuit arrangement as claimed in claim 1, wherein said means for providing an instantaneous emitter-collector voltage drop approaching zero comprises an impedance having a value sufficiently high to provide such a drop.

3. A circuit arrangement comprising a transistor having emitter and base electrodes defining an input electrode system and a collector electrode defining with one of said electrodes an output electrode system, means for producing electrical oscillations comprising a feedback circuit intercoupling said output electrode system and said input electrode system in a manner to produce a positive feedback, means for deriving an output signal from said output electrode system, said transistor undergoing variations in collector current in response to temperature variations, means connected between said collector electrode and one of the electrodes of said input electrode system for providing an instantaneous emitter-collector voltage drop approaching zero thereby to limit the amplitude of said oscillations and to produce an output signal having an amplitude which varies substantially solely in accordance with said temperature, and utilization means responsive to said output signal amplitude and coupled to said output electrode system.

4. A circuit arrangement as claimed in claim 3, wherein said means for providing an instantaneous emitter-collector voltage drop approaching zero comprises an impedance having a value sufficiently high to provide such a drop.

5. A circuit arrangement comprising a transistor having emitter and base electrodes defining an input electrode system and a collector electrode defining with one of said electrodes an output electrode system, means for producing electrical oscillations comprising a feedback circuit intercoupling said output electrode system and said input electrode system in a manner to produce a positive feedback, means for deriving an output signal from said output electrode system, said transistor undergoing variations in collector current in response to temperature variations, means connected between said collector electrode and one of the electrodes of said input electrode system for producing an instantaneous emitter-collector voltage drop approaching zero thereby to limit the amplitude of said oscillations and to produce an output signal having an amplitude which varies substantially solely in accordance with said temperature, said output signal amplitude decreasing to zero when said temperature exceeds a a critical value, and utilization means responsive to said output signal amplitude and coupled to said output electrode system.

6. A circuit arrangement comprising a transistor having emitter and base electrodes defining an input electrode system and a collector electrode defining with one of said electrodes an output electrode system, means for producing electrical oscillations comprising a feedback circuit intercoupling said output electrode system and said input electrode system in a manner to produce a positive feedback, means for deriving an output signal from said output electrode system, said transistor undergoing variations in collector current in response to temperature variations, means connected between said collector electrode and one of the electrodes of said input electrode system for providing an instantaneous emitter-collector voltage drop approaching zero thereby to limit the amplitude of said oscillations and to produce an output signal having an amplitude which varies substantially solely in accordance with said temperature, and temperature regulating means responsive to said output signal amplitude and coupled to said output electrode system.

7. A circuit arrangement comprising a transistor having emitter and base electrodes defining an input electrode system and a collector electrode, means for producing electrical oscillations comprising a feedback circuit intercoupling said collector electrode and said input electrode system in a manner to produce a positive feedback, means for deriving an output signal from said collector electrode, said transistor undergoing variations in collector current in response to temperature variations, means connected between said collector electrode and one of the electrodes of said input electrode system for providing an instantaneous emitter-collector voltage drop approaching zero thereby to limit the amplitude of said oscillations and to produce an output signal having an amplitude which varies substantially solely in accordance with said temperature, said output signal amplitude increasing in magnitude when said temperature decreases in value and decreasing in magnitude when said temperature increases in value, and temperature regulating means responsive to said output signal amplitude and coupled to said collector electrode, said temperature regulating means being positioned to vary the temperature of said transistor.

8. A circuit arrangement comprising a transistor having emitter and base electrodes defining an input electrode system and a collector electrode defining with one of said electrodes an output electrode system, means for producing electrical oscillations comprising a feedback circuit intercoupling said output electrode system and said input electrode system in a manner to produce a positive feedback, means for deriving an output signal from said output electrode system, said transistor undergoing variations in collector current in response to temperature variations, means connected between said collector electrode and one of the electrodes of said input electrode system for producing an instantaneous emitter-collector voltage drop approaching zero thereby to limit the amplitude of said oscillations and to produce an output signal having an amplitude which varies substantially solely in accordance with said temperature, said output signal amplitude decreasing to zero due to the minimum collector voltage indicated by said emitter-collector voltage drop approaching zero when said temperature exceeds a critical value and being determined by the difference between a collector direct voltage produced by a selected temperature below said critical value and said minimum collector voltage, and utilization means responsive to said output signal amplitude and coupled to said output electrode system.

9. A temperature regulating circuit arrangement comprising a transistor having emitter and base electrodes defining an input electrode system and a collector electrode defining with one of said electrodes an output electrode system, means for producing electrical oscillations comprising a feedback circuit intercoupling said output electrode system and said input electrode system in a manner to produce a positive feedback, means for deriving an output signal from said output electrode system, said transistor undergoing variations in collector current in response to temperature variations, means connected between said collector electrode and one of the electrodes of said input electrode system for providing an instantaneous emitter-collector voltage drop approaching zero thereby to limit the amplitude of said oscillations and to produce an output signal having an amplitude which varies substantially solely in accordance with said temperature, and temperature regulating means comprising a heating winding and means for applying said output signal to said heating winding, said heating winding being positioned to vary the temperature in the vicinity of said transistor, said heating winding providing relatively more heat upon the application thereto of an output signal of relatively increased magnitude produced by a relative temperature decrease and providing relatively less heat upon the application thereto of an output signal of relatively decreased magnitude produced by a relative temperature increase.

References Cited in the file of this patent

UNITED STATES PATENTS

| | | |
|---|---|---|
| 2,402,662 | Ohl | June 25, 1946 |
| 2,696,739 | Endres | Dec. 14, 1954 |
| 2,702,838 | Haynes | Feb. 22, 1955 |
| 2,731,564 | Edlstein | Jan. 17, 1956 |
| 2,757,243 | Thomas | July 31, 1956 |
| 2,778,942 | Ehret et al. | Jan. 22, 1957 |

FOREIGN PATENTS

| | | |
|---|---|---|
| 1,090,759 | France | Apr. 4, 1955 |